US010489575B1

(12) United States Patent
Mossoba et al.

(10) Patent No.: US 10,489,575 B1
(45) Date of Patent: *Nov. 26, 2019

(54) IDENTITY VERIFICATION USING AUTONOMOUS VEHICLES

(71) Applicant: Capital One Services, LLC, McLean, VA (US)

(72) Inventors: Michael Mossoba, McLean, VA (US); Abdelkader M'Hamed Benkreira, McLean, VA (US); Joshua Edwards, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/295,293

(22) Filed: Mar. 7, 2019

Related U.S. Application Data

(63) Continuation of application No. 16/182,586, filed on Nov. 6, 2018, now Pat. No. 10,275,589.

(51) Int. Cl.
| | | |
|---|---|---|
| *G06F 7/04* | (2006.01) | |
| *G06F 21/35* | (2013.01) | |
| *G06Q 40/02* | (2012.01) | |
| *G06F 21/32* | (2013.01) | |
| *G06Q 20/24* | (2012.01) | |
| *G05D 1/00* | (2006.01) | |

(52) U.S. Cl.
CPC .......... *G06F 21/35* (2013.01); *G05D 1/0094* (2013.01); *G06F 21/32* (2013.01); *G06Q 20/24* (2013.01); *G06Q 40/025* (2013.01); *G05D 1/0088* (2013.01)

(58) Field of Classification Search
CPC .................. G06F 21/32; G06F 21/35

USPC ........................................................... 726/7
See application file for complete search history.

(56) References Cited

U.S. PATENT DOCUMENTS

| | | | |
|---|---|---|---|
| 8,983,682 B1* | 3/2015 | Peeters ................ | B64C 39/024 244/190 |
| 9,373,149 B2* | 6/2016 | Abhyanker ............ | G06Q 50/28 |
| 9,603,019 B1* | 3/2017 | Ramatchandirane ........ H04W 12/06 | |
| 9,921,579 B1 | 3/2018 | Schaffalitzky | |
| 2005/0162309 A1* | 7/2005 | Humphries ........... | G01S 5/0027 342/357.31 |
| 2006/0167597 A1* | 7/2006 | Bodin .................. | G01C 21/005 701/3 |
| 2011/0035149 A1* | 2/2011 | McAndrew .......... | G05D 1/0038 701/466 |
| 2016/0050213 A1* | 2/2016 | Storr ...................... | G06F 21/32 726/6 |
| 2017/0147959 A1* | 5/2017 | Sweeney .............. | G05D 1/0022 |

(Continued)

OTHER PUBLICATIONS

Bindemann et al. "Person identification from aerial footage by a remote-controlled drone" Scientific Reports, Oct. 19, 2017, URL: https://www.nature.com/articles/s41598-017-14026-3.

(Continued)

*Primary Examiner* — Samson B Lemma

(57) ABSTRACT

Various embodiments are generally directed to identity verification using autonomous vehicles. A security policy may be used to determine when identity verification using autonomous vehicles is required. The autonomous vehicle may be deployed to a location to verify the identity of the user based on one or more of images, audio data, biometric data, and wireless data connections.

20 Claims, 7 Drawing Sheets

(56) References Cited

U.S. PATENT DOCUMENTS

| | | | |
|---|---|---|---|
| 2018/0012433 A1* | 1/2018 | Ricci | H04L 9/321 |
| 2018/0075407 A1* | 3/2018 | Chivukula | G06Q 10/0834 |
| 2018/0276488 A1* | 9/2018 | Yoo | G06K 9/00288 |
| 2018/0276674 A1* | 9/2018 | Ramatchandirane | G06F 21/335 |
| 2019/0031144 A1* | 1/2019 | Gat | B60R 25/25 |

OTHER PUBLICATIONS

Author Unknown, Amazon Prime Air Amazon, Dec. 7, 2016 URL: https://www.amazon.com/Amazon-Prime-Air/b?ie=UTF8&node=8037720011.

* cited by examiner

IDENTITY VERIFICATION USING AUTONOMOUS VEHICLES

RELATED APPLICATIONS

This application is a Continuation of U.S. patent application Ser. No. 16/182,586, entitled "IDENTITY VERIFICATION USING AUTONOMOUS VEHICLES" filed on Nov. 6, 2018. The contents of the aforementioned application is incorporated herein by reference.

TECHNICAL FIELD

Embodiments herein generally relate to security, and more specifically, to identity verification using autonomous vehicles to provide enhanced security.

BACKGROUND

Verification of a user's identity is critical in many settings. Conventional solutions to verify user identity include knowledge-based inquiries, such as a security code or challenge. However, knowledge-based inquiries can easily be compromised by malicious users, especially when unauthorized access has been obtained to the user's account and/or devices. For example, someone who has stolen a smartphone may intercept one-time passcodes sent via text messaging and/or email to access an account.

SUMMARY

Embodiments disclosed herein provide systems, methods, articles of manufacture, and computer-readable media for performing identity verification using autonomous vehicles. In one example, embodiments may receive an indication that an account has been locked based on a number of invalid attempts to access the account exceeding a threshold specified in a security policy, determine an address associated with the account and at least one verification action required to unlock the account, transmit, to a device associated with the account, an indication of the at least one verification action required to unlock the account, transmit, to the device associated with the account, an indication that the autonomous vehicle is proximate to the address, cause the camera to capture a first image of a user associated with the account proximate to a building associated with the address, determine, based on an analysis of the first image, that the user is depicted in the first image, cause the camera to capture a second image of the user associated with the account, determine, based on an analysis of the second image, that the user has performed the at least one verification action, and cause the account to be unlocked based on the indications received from the autonomous vehicle specifying that the user is proximate to the building and that the at least one verification action has been performed.

DETAILED DESCRIPTION

Figure 1:
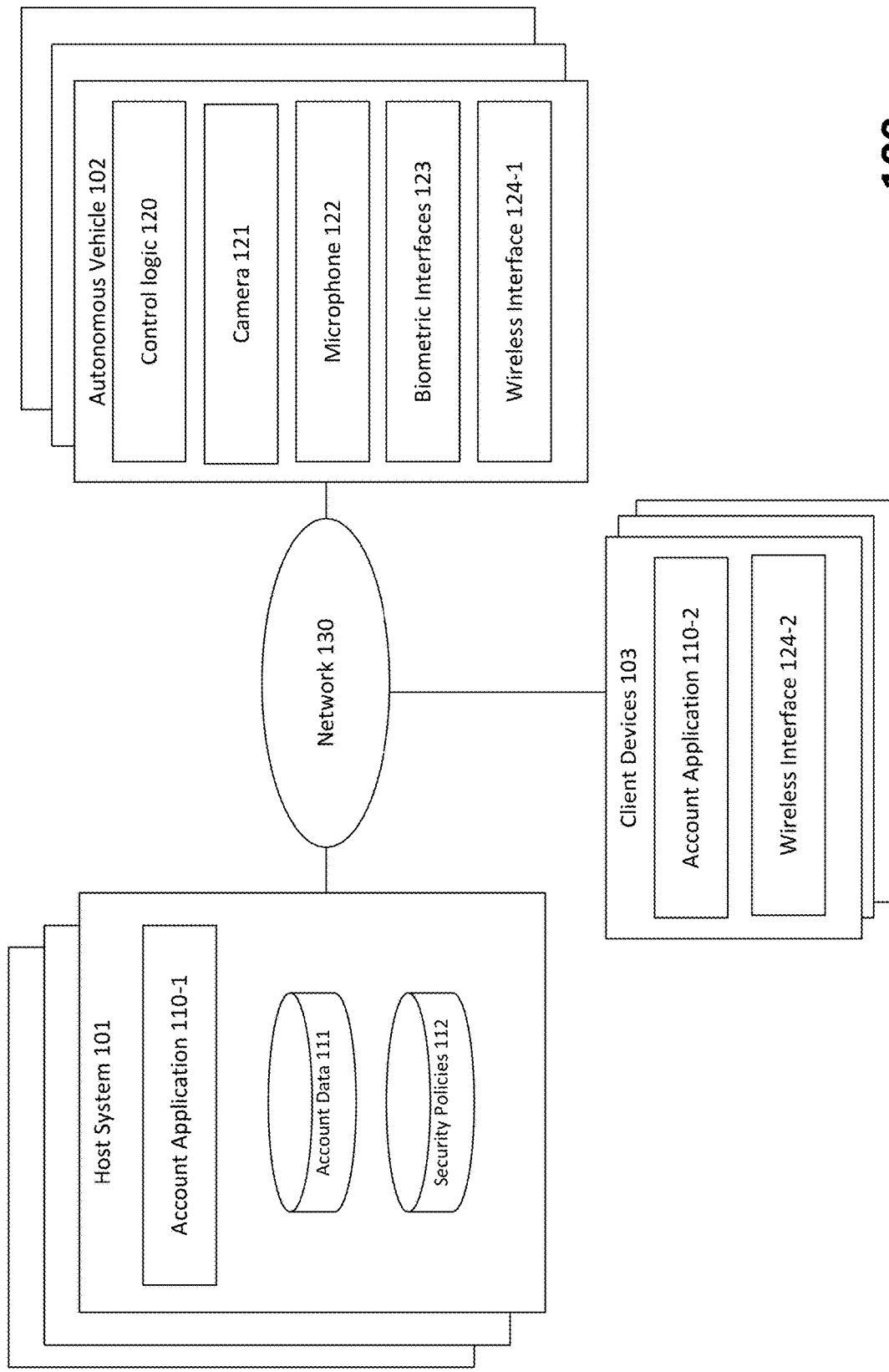
FIG. 1 illustrates an embodiment of a system.

Embodiments disclosed herein provide enhanced solutions for verifying user identity. More specifically, embodiments disclosed herein leverage autonomous vehicles to verify the identity of users. Generally, embodiments disclosed herein may identify scenarios where the identity of a user must be verified, e.g., based on a security policy. Example scenarios where user identity must be verified include, but are not limited to, when a user has been locked out of an online account, when a user attempts to modify information in their account, when a user attempts to make a purchase, and the like. In response, embodiments disclosed herein may deploy an autonomous vehicle (such as a drone) to a known location of the user (e.g., an account billing address, the address of a merchant where a requested purchase has been attempted, etc.). The autonomous vehicle and the user may be informed of one or more actions required to verify the identity of the user associated with the account. When the autonomous vehicle arrives at the known location, the autonomous vehicle may receive input to verify the identity of the user associated with the account. The input may include, but is not limited to, image input, video input, audio input, biometric input, network connections, and the like.

In one example, the user may be required to approach the autonomous vehicle and display one or more objects (e.g., a credit card, bank card, driver's license, identification card, passport, etc.). The autonomous vehicle may capture an image depicting the user and the associated objects and perform image analysis on the image to identify the user and the objects. For example, using image analysis, the autonomous vehicle may determine that a face depicted in the captured image substantially matches a known image of the user, and that a bank card depicted in the captured image includes the user's name and account number. The autonomous vehicle may then verify the identity of the user and transmit an indication of the successful verification to a remote server. The server may then authorize an operation, such as unlocking the account, authorizing the requested purchase, modifying account details, and the like.

Other examples include the autonomous vehicle capturing images of the user outside and inside of a building at the billing address (e.g., the user's home), allowing the autonomous vehicle to verify that the user has access to the building at the billing address. As another example, the autonomous vehicle may use a microphone to capture speech of the user and compare the captured speech to a known speech of the user. If the captured speech is similar to the known speech, the autonomous vehicle may verify the user's identity. As another example, the autonomous vehicle may capture biometric input, such as fingerprints, iris scans, and the like, and compare the captured input to known biometric data of the user. In another example, the autonomous vehicle may connect to a device of the user, and verify the user based on a known identifier of the device, e.g., a media access control (MAC) address of the device. Regardless of the verification techniques implemented by the autonomous vehicle, the autonomous vehicle may provide an indication of the result of the attempted verification (e.g., the user's identity is verified, is not verified, etc.) to a server to permit or restrict a requested operation. Doing so improves the security of computing systems and associated accounts.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes one or more host systems 101, one or more autonomous vehicles 102, and one or more client devices 103. The host systems 101 are representative of any type of computing system or device, such as servers, compute clusters, cloud computing environments, and virtualized computing systems. The autonomous vehicles 102 are representative of any type of autonomous vehicle, such as a drone (also referred to as unmanned aerial vehicles), robots, self-driving autonomous cars, and the like. The client devices 103 are representative of any type of computing device, such as desktop computers, laptops, smartphones, tablets, and the like.

As shown, the host system 101 includes an instance of an account application 110-1 and data stores of account data 111 and security policies 112. The account application 110-1 is generally configured to manage user accounts stored in the account data 111 according to one or more security policies in the security policies 112. The account application 110-1 may further leverage the autonomous vehicles 102 to verify the identity of a user of an account in the account data 111 based on the security policies 112. The instance of the account application 110-2 on the client devices 103 allows users to access and/or modify their account details in the account data 111, make purchases (e.g., using payment tokens), create new accounts, and the like.

The security policies 112 may specify different rules, actions, and/or operations indicating what types of requested operations require identity verification using the autonomous vehicles 102, what operations should be performed by the autonomous vehicles 102 to verify the user's identity (e.g., whether to capture images, video, speech, biometric input, etc.), and the like. For example, if a user has recently changed their billing address and attempts to make a purchase exceeding a specified dollar amount threshold, the security policies 112 may specify to use the autonomous vehicles 102 to verify the user's identity at the point of sale (and/or at a location of the client device 103, if the client device 103 and/or account application 110-2 is being used to make an online purchase), and require multiple forms of identity verification (e.g., voice verification and fingerprint verification). However, if the user has been at the same billing address for many years (or for a length of time exceeding a predefined threshold), the security policy 112 may specify to use the autonomous vehicles 102 to verify the user's identity, but only using one form of identity verification (e.g., image-based identity verification) to complete the purchase.

For example, if a user of a client device 103 uses the account application 110-2 to modify data for their account in the account data 111 (e.g., to change an email address, billing address, request a credit increase, modify income levels, etc.), the account application 110-1 may determine that the applicable security policies 112 require an autonomous vehicle 102 to verify the identity of the user before permitting the modification to the account data 111. Similarly, if the user of client device 103 uses the account application 110-2 to make a purchase, the account application 110-1 may determine that the applicable security policies 112 require an autonomous vehicle 102 to verify the identity of the user before permitting the purchase. As another example, if the account application 110-1 has locked access to the account in the account data 111 (e.g., based on a predefined number of unsuccessful login attempts), the account application 110-1 may require the autonomous vehicle 102 to verify the identity of the user before unlocking the account.

As shown, the autonomous vehicles 102 are under the control of a control logic 120, and include at least a camera 121, microphone 122, one or more biometric interfaces 123, and a wireless interface 124-1. The control logic 120 is generally configured to control the operation of the autonomous vehicles 102, including controlling the travel of the autonomous vehicle 102 (e.g., using a global positioning system (GPS) radio, not depicted for clarity) and controlling the identity verification of users. The camera 121 is configured to capture images and/or video of the environment surrounding the autonomous vehicle 102. The microphone 122 is configured to capture audio data. The biometric interfaces 123 are representative of any number and type of interfaces for receiving biometric input, such as fingerprint scanners, hand scanners, retina scanners, iris scanners, and the like. In some embodiments, the camera 121 and/or microphone 122 are used to receive biometric input (e.g., images for face recognition, speech data for voice recognition, etc.). The wireless interface 124-1 and the wireless interface 124-2 of the client devices 103 are representative of any type of interface for wireless data transmissions, such as Bluetooth® interfaces, Wi-Fi® interfaces, etc.

As stated, the account application 110-1 uses the applicable security policies 112 to determine whether an autonomous vehicle 102 should be used to perform user identity verification. For example, if a user of the client device 103 has entered an incorrect (or invalid) username and/or password 5 times via the account application 110-2, the account application 110-1 may lock the user's account based on the security policies 112, which specify to lock the account after 5 incorrect login attempts. The security policies 112 may further specify the verification actions (e.g., image capture, fingerprint reading, establishing device connections, etc.) required to verify the user's identity using the autonomous vehicle 102, as well as any known data of the user in the account data 111 (e.g., known images of the user, known speech of the user, known biometric identifiers, known devices, known device MAC addresses, etc.). In at least one embodiment, the account application 110-1 may require the user to pass a knowledge-based verification challenge before deploying an autonomous vehicle 102 to perform identity verification. For example, the account application 110-1 may require the user to provide an account PIN, valid security challenge response, etc., before deploying the autonomous vehicle 102 to perform identity verification.

The account application 110-1 may transmit an indication of the verification actions and the billing address of the user (or account) in the account data 111 to the wireless interface 124-1 of the autonomous vehicle 102 via the network 130. The control logic 120 may cause the autonomous vehicle 102 to travel to the received billing address to perform the verification actions. In one embodiment, the control logic 120 may translate the received address to a different format to control the travel of the autonomous vehicle 102 (e.g., to translate a street address to GPS coordinates and/or latitude/longitude coordinates).

In addition, the account application 110-1 may transmit information to the account application 110-2 of client device 103 regarding the autonomous vehicle 102 identity verification. Generally, the account application 110-2 may inform the user that the autonomous vehicle 102 will be arriving to perform identity verification, provide a map detailing a current location of the autonomous vehicle 102, provide a notification when the autonomous vehicle 102 arrives, and provide indications of the actions required to verify the user's identity.

When the autonomous vehicle 102 arrives at or near the specified location (e.g., the billing address, the current location of the client device 103, etc.), the account application 110-2 may inform the user that the autonomous vehicle 102 has arrived. The account application 110-2 may then guide the user through the verification process. For example, if the user should provide their fingerprint, the account application 110-2 may include, for example, graphical user interfaces (GUIs) that show the user where the fingerprint scanner is on the autonomous vehicle 102. As another example, if the verification action requires capturing of an image, the account application 110-2 may include GUIs describing what should be depicted in the image (e.g., the user, their credit card or bank card, the user performing a gesture, etc.), and may include a GUI depicting the current view of the camera 121. The GUIs may also include input elements allowing the user to cause images to be captured by the camera 121, audio data to be recorded by the microphone 122, and biometric data to be collected by the biometric interfaces 123.

The control logic 120 of the autonomous vehicle 102 may then capture the relevant data required to perform each verification action (e.g., capture images, record audio data, and receive biometric input). The control logic 120 may then process the received data to verify the user's identity. In some embodiments, however, the control logic 120 may "offload" such processing to the host system 101 by transmitting the received data (e.g., images, audio, biometric data) via the wireless interface 124-1.

For example, the control logic 120 may compare received speech data to known speech data of the user. If the received speech data matches the known speech data, the control logic 120 may verify the identity of the user. Otherwise, the control logic 120 may determine that the identity of the user is not verified. Generally, if the identity of the user is not verified, the control logic 120 may transmit an indication to the account application 110-1, and optionally make additional attempts to verify the user's identity. As additional examples, the control logic 120 may compare biometric data received via the biometric interfaces 123 to known biometric data of the user stored in the account data 111. As stated, the control logic 120 may layer any number and type of verification actions to verify the identity of the user (e.g., image verification, voice verification, and biometric verification).

As another example, the control logic 120 may perform image analysis using computer vision algorithms (and/or other image analysis algorithms) to detect the user and/or other objects in captured images. For example, if a person depicted in the captured image matches an image of the user stored in the account data 111, the control logic 120 may verify the user's identity. Similarly, the verification action may require the control logic 120 to identify, in the captured images, known objects in the user's residence (e.g., furniture, furnishings, etc.) and/or the residence itself. In such an example, the autonomous vehicle 102 may capture images of the interior of the residence through a window, open door, etc. To verify the residence itself, the account application 110-2 may specify that the user captures one or more images depicting the user and at least a portion of the residence. As another example, the control logic 120 may verify the user's identity based on identifying the user's bank card in a captured image. As another example, the control logic 120 may verify the user's identity based on a sequence of images (e.g., images depicting the user inside the residence, entering the residence, exiting the residence, outside the residence, etc.). For example, a first image may depict the user outside the residence, and a second image may depict the user entering the residence.

As yet another example, the verification action may require the user to make a gesture, such as clapping their hands one or more times. In such an example, the autonomous vehicle 102 may capture images of the user, and analyze the images to detect one or more instances of the user clapping their hands. For example, the autonomous vehicle 102 may detect at least one image where the user's hands are separated, and at least one image where the user's hand are touching as part of the clapping gesture. As stated, the verification action may be any type of gesture, and the autonomous vehicle 102 may analyze captured images to detect the user performing the gesture. Therefore, in another example, the verification may require the user to sit and stand while holding their bank card. As such, the autonomous vehicle 102 may capture images of the user while the user sits and stands while holding their bank card. The autonomous vehicle 102 may then analyze the images to detect the user, the bank card, the user sitting while holding the bank card, and the user standing while holding the bank card.

As stated, a wireless connection between the wireless interfaces 124-1, 124-2 may be used to verify the user identity. For example, the control logic 120 may cause establishment of a connection between the wireless interface 124-1 of the autonomous vehicle 102 and the wireless interface 124-2 of the client device 103. The control logic 120 may then compare a MAC address of the wireless interface 124-2 to a list of known MAC addresses associated with the account in the account data 111. If the MAC address of the wireless interface 124-2 is not specified as one of the known MAC addresses, the identity of the user may not be verified. If the MAC address of the wireless interface 124-2 is specified as one of the known MAC addresses, the identity of the user may be verified. Furthermore, data may be exchanged between the client device 103 and the autonomous vehicle 102 via the wireless connection (e.g., tokens, data structures, etc.). The control logic 120 may compare data received from the client device 103 to known data in the account data 111 to verify the identity of the user.

Figure 2C:
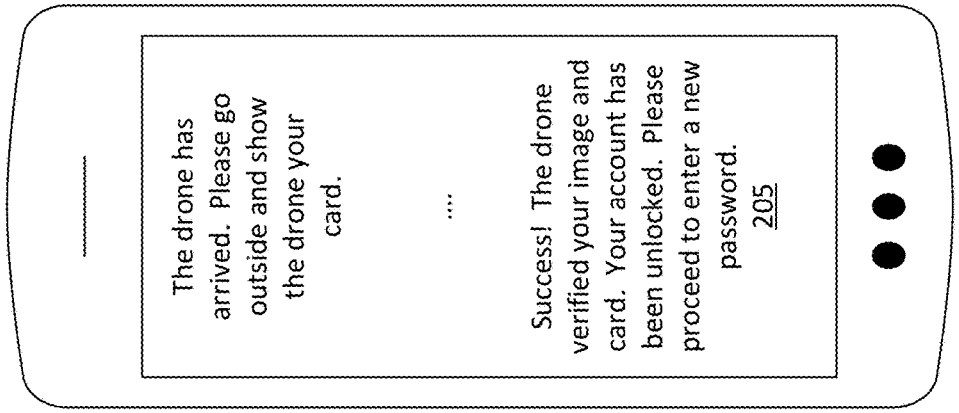
FIG. 2A, FIG. 2B, and FIG. 2C illustrate example user interfaces.
Figure 2B:
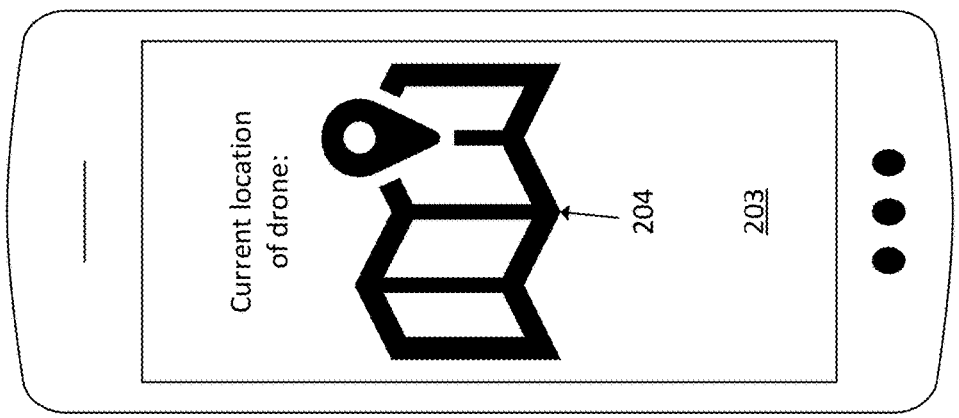
Figure 2A:
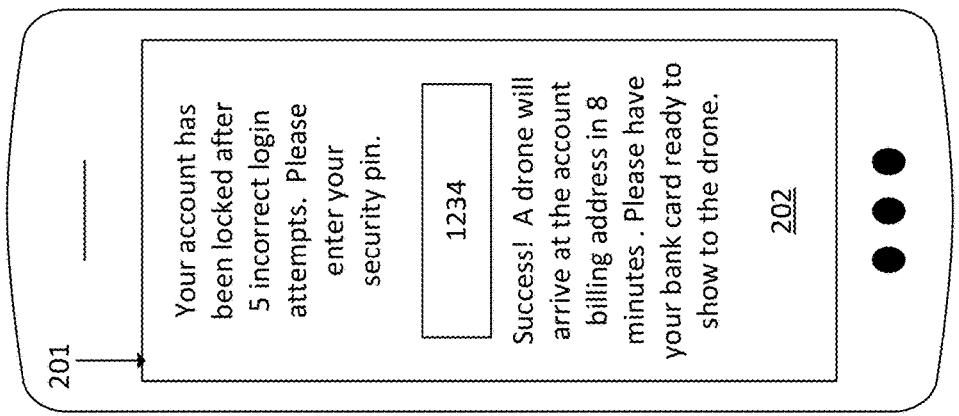

FIG. 2A illustrates an embodiment of a client device 103. As shown, a display 201 of the client device 103 outputs a GUI 202 of the account application 110-2 indicating that the user's account has been locked after five incorrect login attempts have been received. The GUI 202 also includes a field for receiving a security PIN. If the security PIN is not entered correctly, the account application 110-2 may refrain from deploying an autonomous vehicle 102 to verify the identity of the user. As shown, however, the security PIN is entered correctly, and the account application 110-2 transmits an indication to the account application 110-1 to deploy an autonomous vehicle 102 to the billing address of the user to verify the identity of the user. The GUI 202 depicts an estimated arrival time of 8 minutes for the autonomous vehicle 102 and indicates that the user should have their bank card ready to show to the autonomous vehicle 102.

FIG. 2B illustrates a GUI 203 of the account application 110-2 depicting a map 204 showing the current (or real-time) location of the autonomous vehicle 102 in transit to the billing address of the user. Generally, the autonomous vehicle 102 may periodically transmit an update of its location to the account application 110-1, which may provide the received location to the account application 110-2 of the client device 103. The account application 110-2 may then update the map 204 to reflect the received location of the autonomous vehicle 102.

FIG. 2C illustrates the client device 103 outputting a GUI 205 of the account application 110-2. As shown, the GUI 205 informs the user that the autonomous vehicle 102 has arrived (e.g., based on an indication received from the autonomous vehicle 102 specifying that the autonomous vehicle 102 is proximate to the billing address), and that the user should go outside to show their bank card to the autonomous vehicle 102. As stated, the autonomous vehicle 102 may capture one or more images of the user and/or the bank card. The autonomous vehicle 102 (and/or the account application 110-1) may then process the captured images to identify the user and the bank card in the captured images. As shown, the autonomous vehicle 102 verified the user and the bank card in the captured images. As such, the autonomous vehicle 102 may transmit an indication of the successful verification to the account application 110-1, which may unlock the user's account. The user may then be instructed to take further action to access their account.

Figure 3:
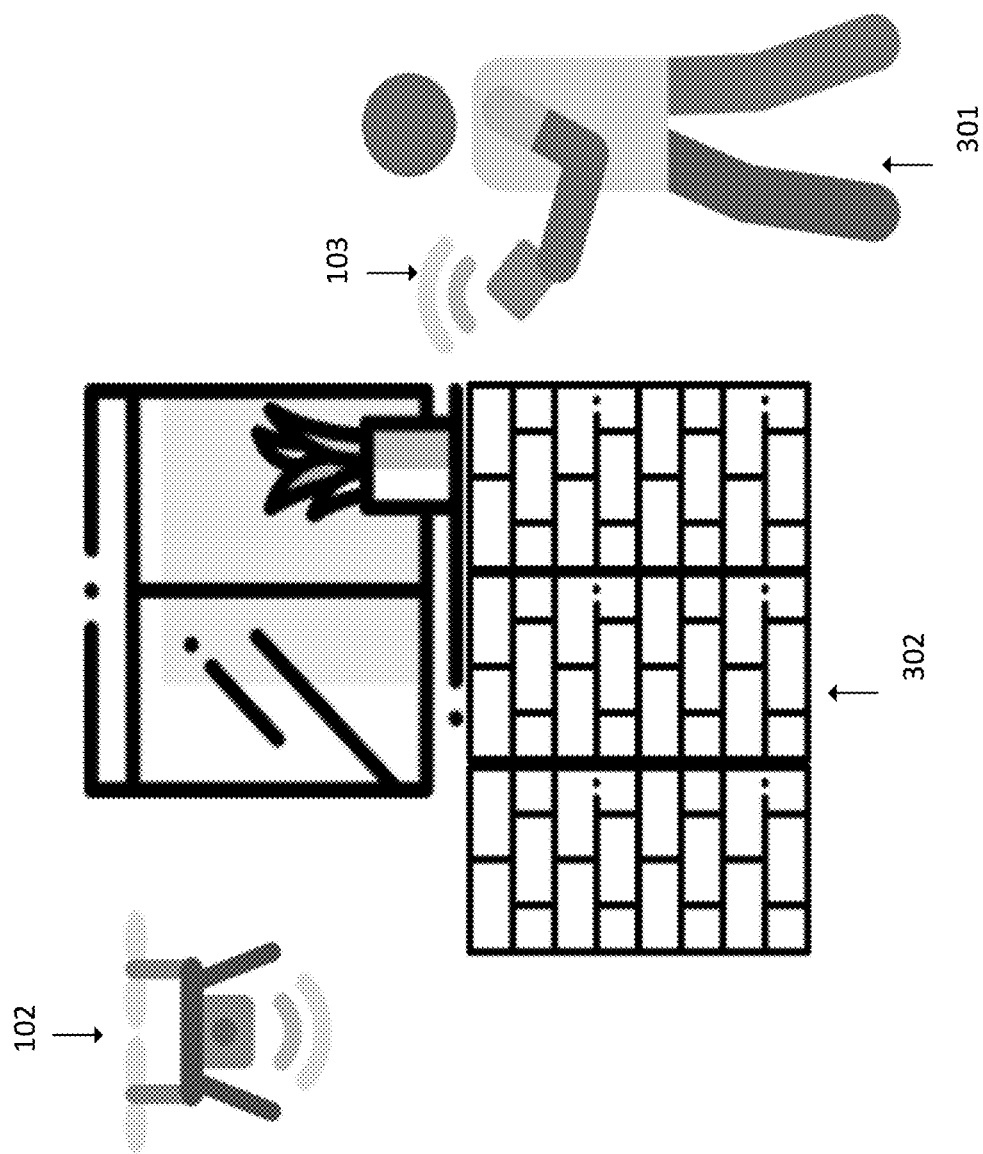
FIG. 3 illustrates an example of identity verification using autonomous vehicles.

FIG. 3 is a schematic 300 illustrating an example of using an autonomous vehicle 102 to verify the identity of a user 301. As shown, the autonomous vehicle 102 is a drone in proximity of a residence 302 of the user 301. As stated, the drone 102 may capture images of the user 301 and/or capture images of the residence 302 to verify the identity of the user associated with an account. For example, the captured images may be analyzed to identify known objects associated with the residence 302 (e.g., the brick exterior of the residence 302), or other objects inside the residence 302. As another example, facial recognition may be applied to captured images depicting the user 301 to verify that the user 301 is the user associated with the account. As stated, the drone 102 may receive other types of input to verify the identity of the user. For example, the user 301 may provide a biometric input. As another example, the drone 102 may connect to the device 103 held by the user, and verify the user based at least in part on a MAC address of the device 103 matching a known MAC address in the account data 111.

Figure 4:
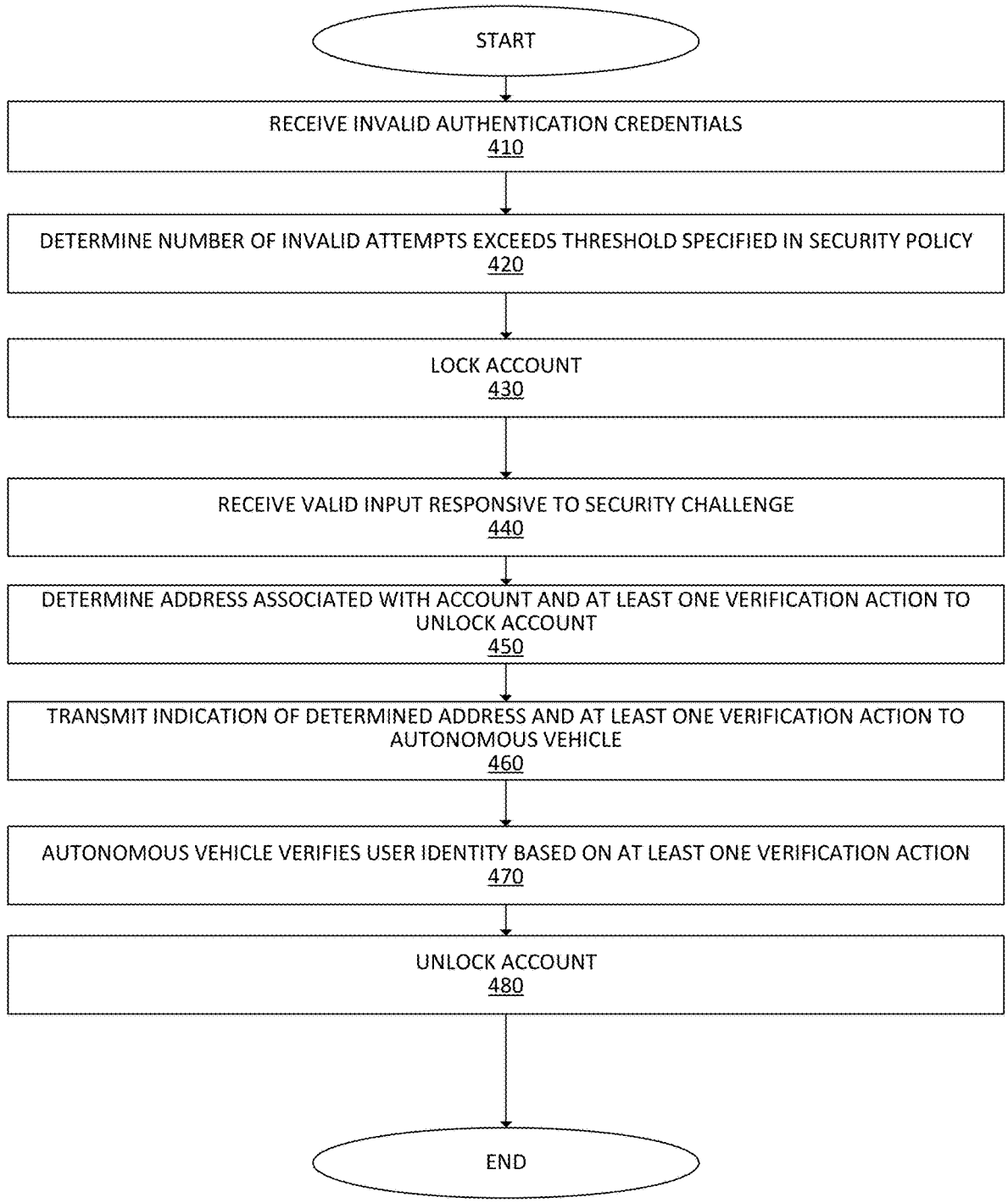
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to verify the identity of a user using an autonomous vehicle 102. Embodiments are not limited in this context.

As shown, the logic flow 400 begins at block 410, where the account application 110-1 (and/or the account application 110-2) receives invalid authentication credentials to access an account in the account data 111. For example, the account application 110-1 may receive an invalid username and/or an invalid password. At block 420, the account application 110-1 determines that a number of received invalid login attempts exceeds a threshold number of invalid login attempts in a security policy 112. At block 430, the account application 110-1 locks access to the account in the account data 111.

At block 440, the account application 110-1 receives a valid input responsive to a security challenge. For example, the user may provide a PIN number, security challenge, fingerprint, etc. At block 450, the account application 110-1 determines a billing address associated with the account from the account data 111 and at least one verification action associated with unlocking the account from the security policies 112. As stated, any number and type of verification actions may be specified based on the security policies 112. In some embodiments, the number and type of verification actions may be associated with a length of time the current billing address in the account data 111 has been specified as the billing address of the user. Generally, the security policies 112 may require more stringent verification actions and/or additional numbers of verification actions the more recently the user has changed their billing address. Doing so prevents malicious users from changing account details in the account data 111.

At block 460, the account application 110-1 transmits an indication of the determined address of the user and the determined at least one verification action to an autonomous vehicle 102. The account application 110-1 may identify the autonomous vehicle 102 based on a proximity of the autonomous vehicle 102 to the determined address. The autonomous vehicle 102 may then travel to the specified address to attempt to verify the identity of the user based on the at least one verification action. At block 470, the autonomous vehicle 102 verifies the user's identity based on performance of the at least one verification action. For example, the autonomous vehicle 102 may confirm that the user is depicted in a captured image, confirm that the user's speech is present in captured audio data, confirm a MAC address of a client device 103 of the user, and/or confirm a received fingerprint matches a known fingerprint of the user. The autonomous vehicle 102 may then transmit an indication that the user's identity was verified to the account application 110-1. In response, at block 480, the account application 110-1 may unlock the user's account.

Figure 5:
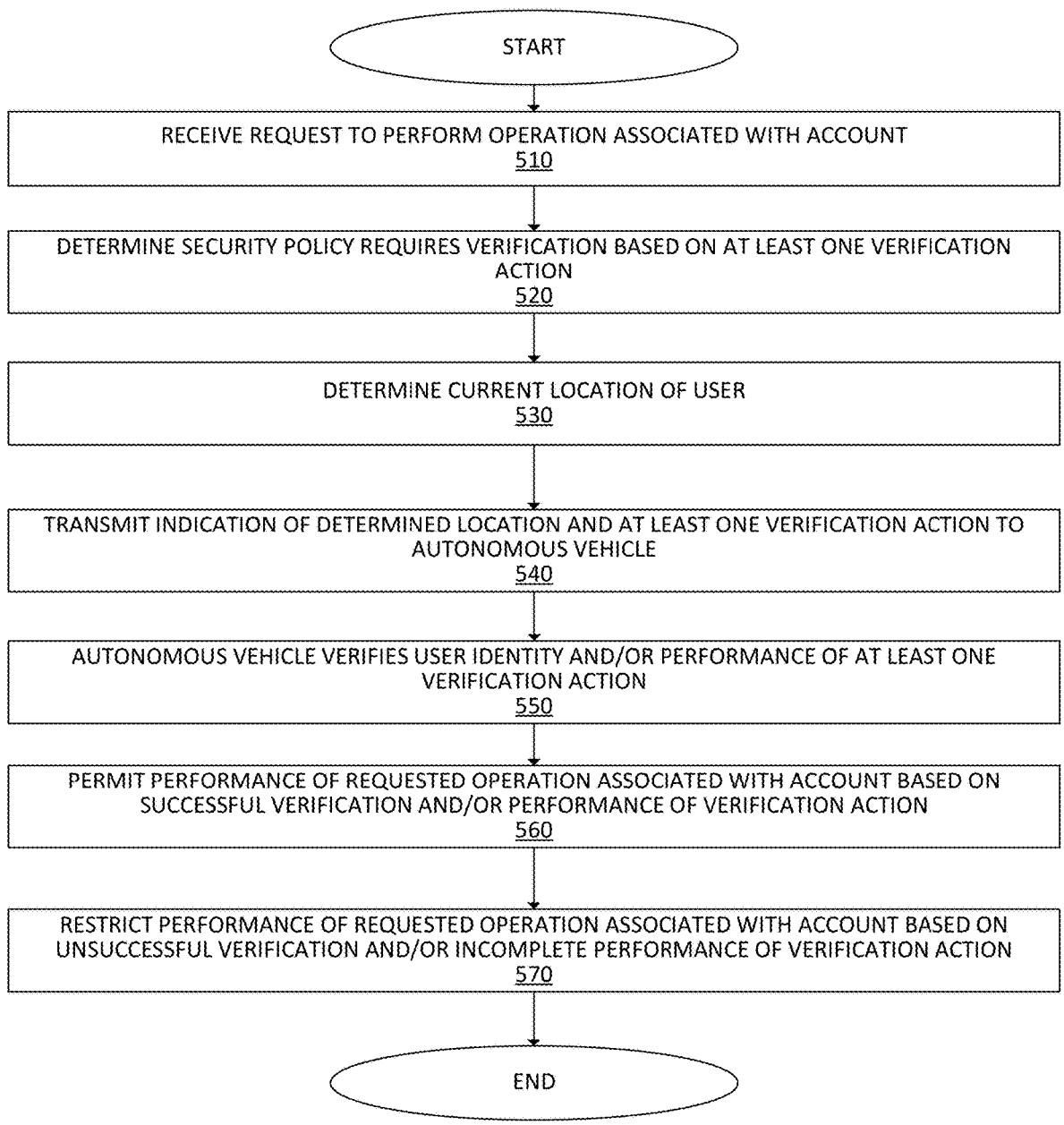
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations to verify the identity of a user using an autonomous vehicle 102. Embodiments are not limited in this context.

As shown, the logic flow 500 begins at block 510, where the account application 110-1 receives a request to perform an operation associated with an account. For example, the operation may be any account-related activity, such as changing account details, attempts to make a purchase, and the like. At block 520, the account application 110-1 determines that a security policy 112 associated with the account requires an autonomous vehicle 102 to verify the identity of the requesting user based on at least one verification action. As stated, the security policy 112 may specify any number and type of verification actions. At block 530, the account application 110-1 determines a current location of the user. For example, if the user is attempting to purchase an object at a retail location, the account application 110-1 may determine a current location of the client device 103 (e.g., based an indication of the location of the client device 103 provided by the account application 110-2).

At block 540, the account application 110-1 transmits an indication of the determined location and the at least one verification action to an autonomous vehicle 102. The autonomous vehicle 102 may then travel to the location of the user. At block 550, the autonomous vehicle 102 verifies the user's identity and/or performance of the at least one verification action. For example, the autonomous vehicle 102 may confirm that the user is depicted in one or more captured images, confirm that the user's bank card is depicted in one or more captured image, confirm that the user's speech is present in captured audio data, confirm a MAC address of a client device 103 of the user, and/or confirm an iris scan matches a known iris scan of the user. Generally, the autonomous vehicle 102 may transmit indications of a result of each attempted verification action to the account application 110-1. If each verification action is successful, at block 560, the account application 110-1 permits performance of the account operation requested at block 510. If each verification action is not completed, at block 570, the account application 110-1 restricts performance of the account operation requested at block 510.

Figure 6:
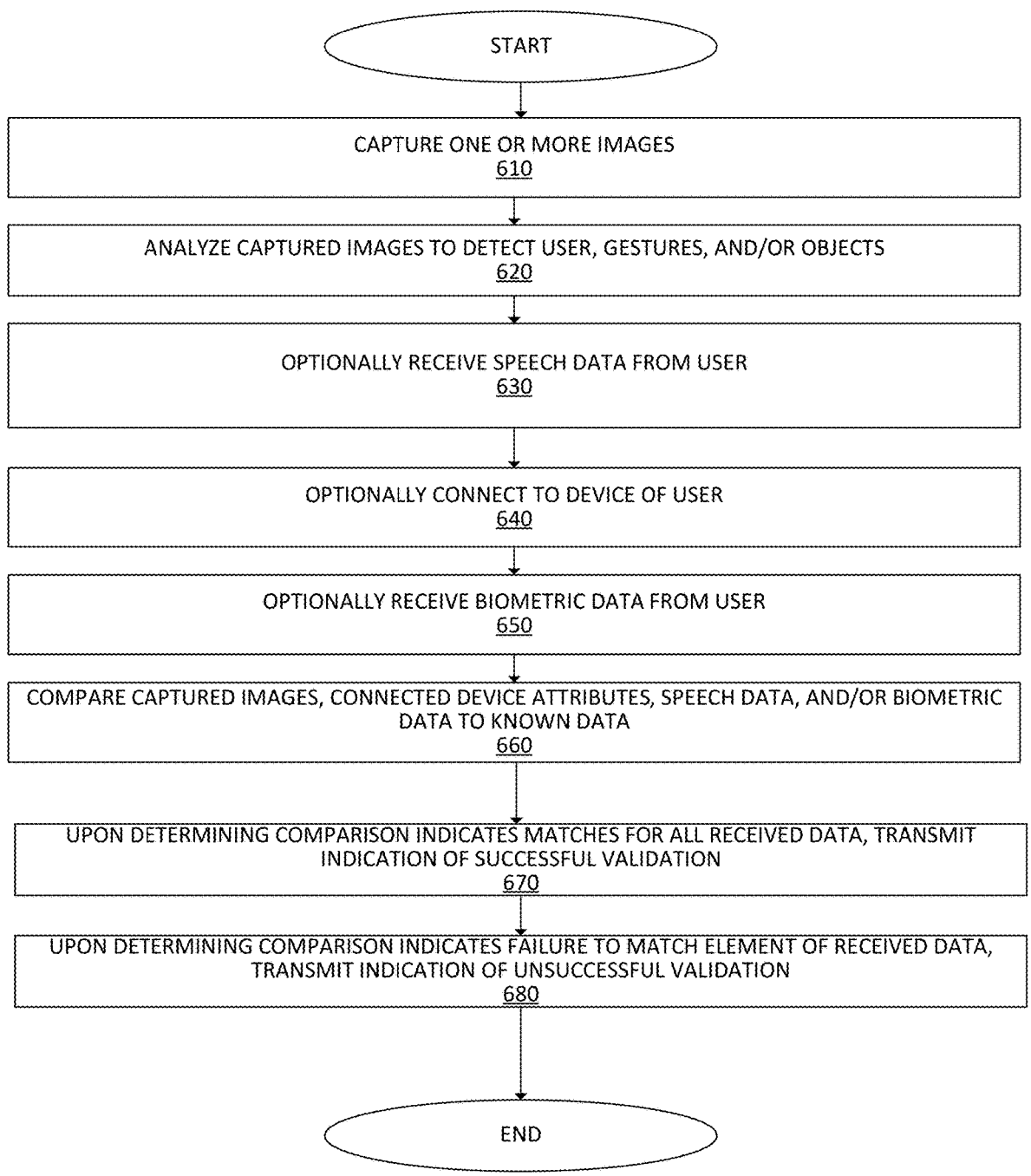
FIG. 6 illustrates an embodiment of a third logic flow.

FIG. 6 illustrates an embodiment of a logic flow 600. The logic flow 600 may be representative of some or all of the operations executed by one or more embodiments described herein. For example, the logic flow 600 may include some or all of the operations to verify the identity of a user using an autonomous vehicle 102. Embodiments are not limited in this context.

As shown, the logic flow 600 includes block 610, where the autonomous vehicle 102 captures one or more images using the camera 121. At block 620, the control logic 120 of the autonomous vehicle 102 may analyze the images captured at block 610, e.g., using computer vision algorithms, to detect the user, detect the user performing one or more gestures, and/or detect one or more objects in the images. For example, if the verification action requires the user to hold their credit card in one hand, and make a waving gesture in the other hand, the control logic 120 analyzes the images to detect the user holding the credit card in one hand and making the waving gesture with the other hand. At block 630, the microphone 122 of the autonomous vehicle 102 receives speech data from the user (e.g., to verify the received speech matches known speech of the user). At block 640, the control logic 120 optionally connects to the client device 103 of the user via the wireless interfaces 124-1, 124-2. Doing so allows the control logic 120 to verify whether the MAC address of the wireless interface 124-2 matches a known MAC address associated with the account. At block 650, the control logic 120 optionally receives a biometric input from the user via the biometric interfaces.

At block 660, the control logic 120 compares the received data to known data associated with the user (e.g., data received from the account data 111). The known data may include known images of the user, known speech of the user, known MAC addresses of the user, known biometric data of the user, etc. At block 670, the control logic 120 transmits an indication of a successful validation to the account application 110-1 upon determining all data received in blocks 610 and 630-650 matches the known data. For example, the control logic 120 may determine that the user (and/or object) is depicted in the images captured at block 610. Similarly, if the image analysis indicates the verification action is depicted in the captured images, the control logic 120 transmits an indication of a successful validation to the account application 110-1. Similarly, if the captured speech data matches known speech data of the user, the control logic 120 transmits an indication of a successful validation to the account application 110. Otherwise, at block 680, the control logic 120 transmits an indication of an unsuccessful validation to the account application 110-1 upon determining the comparison at block 660 indicates a failure to match at least one element of received data. For example, if a received fingerprint does not match a known fingerprint of the user, the control logic 120 transmits an indication of an unsuccessful validation to the account application 110-1, even if all other validation actions have been successfully performed.

Figure 7:
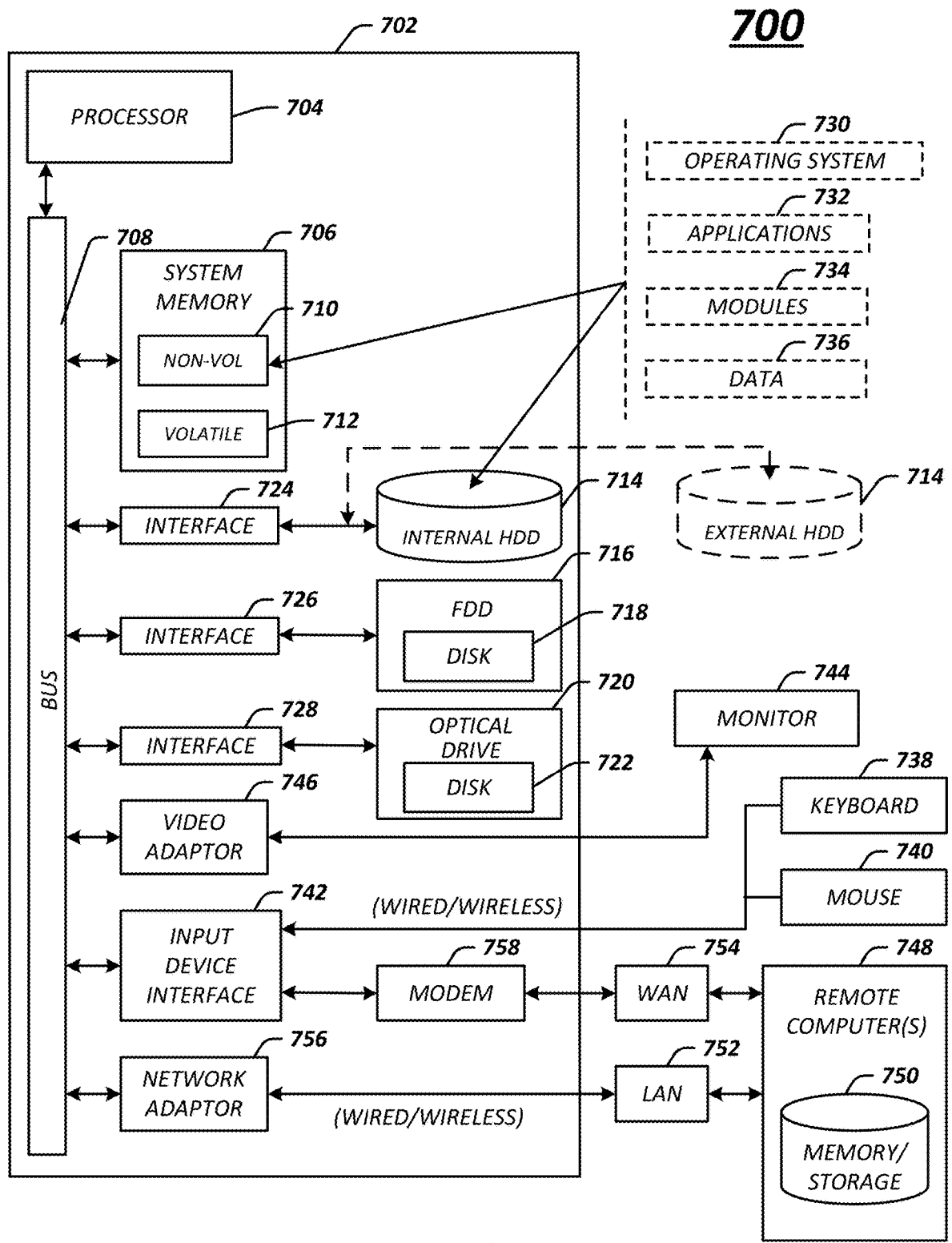
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the host system 101, autonomous vehicle 102, and client device 103 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., the account application 110 and control logic 120.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device (e.g., the wireless interfaces 124-1, 124-2), connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   determining, based on an analysis of authentication credentials received for an account, that the authentication credentials are not valid to access the account;
   locking the account based on a number of invalid attempts to access the account exceeding a threshold specified in a security policy;
   transmitting, to an autonomous vehicle, an indication of an address associated with the account and at least one verification action required to unlock the account;

transmitting, to a device associated with the account, an indication of the at least one verification action required to unlock the account;

receiving an indication from the autonomous vehicle specifying that an analysis of a first image captured proximate to the address depicts a user associated with the account proximate to a building associated with the address;

receiving an indication from the autonomous vehicle specifying that the at least one verification action has been completed based on the analysis of the first image; and unlocking the account based on the indications received from the autonomous vehicle specifying that the user is proximate to the building and that the at least one verification action has been performed.

2. The method of claim 1, wherein the indication received from the autonomous vehicle specifying that the at least one verification action has been completed is further based on at least one of: a second image, received speech data, received biometric data, and pairing the device to the autonomous vehicle.

3. The method of claim 2, further comprising:
determining the device is associated with the account based on a media access control (MAC) address of the device; and
outputting, on the device associated with the account, a real-time map specifying a location of the autonomous vehicle.

4. The method of claim 1, wherein the autonomous vehicle comprises one or more of: (i) an unmanned aerial vehicle, (ii) a robot, and (iii) an autonomous car, wherein the at least one verification action comprises a first verification action, the method further comprising:
determining an amount of time the address has been specified as a billing address for the account, wherein the at least one verification action further comprises a second verification action upon determining the amount of time the address has been specified as the billing address does not exceed a time threshold.

5. The method of claim 1, wherein the account is further locked based on a requested operation to be performed on the account, wherein the requested operation comprises one or more of: (i) changing the address associated with the account, (ii) requesting an increase in a line of credit, (iii) reporting an increase in an income associated with the account, (iv) making a purchase.

6. The method of claim 1, further comprising:
transmitting, to the device associated with the account, an indication that the autonomous vehicle is proximate to the address; and
receiving user input from the device associated with the account specifying that the autonomous vehicle arrived at the address prior to unlocking the account.

7. The method of claim 1, wherein the at least one verification action comprises one or more of: (i) a gesture, (ii) a speech, (iii) a biometric identifier, (iv) pairing the device associated with the account to the autonomous vehicle via a wireless data connection, and (v) holding a card associated with the account, wherein the biometric identifier comprises one or more of: (i) a fingerprint, (ii) an iris scan, and (iii) a face, the method further comprising, prior to transmitting the indication of the address and the at least one verification action required to unlock the account to the autonomous vehicle:

receiving, from the device associated with the account, valid input responsive to a security challenge associated with the account.

8. A non-transitory computer-readable storage medium storing instructions that when executed by a processor, cause the processor to:
determine, based on an analysis of authentication credentials received for an account, that the authentication credentials are not valid to access the account;
lock the account based on a number of invalid attempts to access the account exceeding a threshold specified in a security policy;
transmit, to an autonomous vehicle, an indication of an address associated with the account and at least one verification action required to unlock the account;
transmit, to a device associated with the account, an indication of the at least one verification action required to unlock the account;
receive an indication from the autonomous vehicle specifying that an analysis of a first image captured proximate to the address depicts a user associated with the account proximate to a building associated with the address;
receive an indication from the autonomous vehicle specifying that the at least one verification action has been completed based on the analysis of the first image; and
unlock the account based on the indications received from the autonomous vehicle specifying that the user is proximate to the building and that the at least one verification action has been performed.

9. The non-transitory computer-readable storage medium of claim 8, wherein the indication received from the autonomous vehicle specifying that the at least one verification action has been completed is further based on at least one of: a second image, received speech data, received biometric data, and pairing the device to the autonomous vehicle.

10. The non-transitory computer-readable storage medium of claim 9, wherein the at least one verification action comprises one or more of: (i) a gesture, (ii) a speech, (iii) a biometric identifier, (iv) pairing the device associated with the account to the autonomous vehicle via a wireless data connection, and (v) holding a card associated with the account, wherein the biometric identifier comprises one or more of: (i) a fingerprint, (ii) an iris scan, and (iii) a face, the computer-readable storage medium further comprising instructions executable by the processor to cause the processor to, prior to transmitting the indication of the address and the at least one verification action required to unlock the account to the autonomous vehicle:
receive, from the device associated with the account, valid input responsive to a security challenge associated with the account.

11. The non-transitory computer-readable storage medium of claim 9, further comprising instructions executable by the processor to cause the processor to:
determine the device is associated with the account based on a media access control (MAC) address of the device; and
output, on the device associated with the account, a real-time map specifying a location of the autonomous vehicle.

12. The non-transitory computer-readable storage medium of claim 8, wherein the account is further locked based on a requested operation to be performed on the account, wherein the requested operation comprises one or more of: (i) changing the address associated with the account, (ii) requesting an increase in a line of credit, (iii)

reporting an increase in an income associated with the account, (iv) making a purchase.

13. The non-transitory computer-readable storage medium of claim 8, wherein the autonomous vehicle comprises one or more of: (i) an unmanned aerial vehicle, (ii) a robot, and (iii) an autonomous car, wherein the at least one verification action comprises a first verification action, the computer-readable storage medium further comprising instructions executable by the processor to cause the processor to:
  determine an amount of time the address has been specified as a billing address for the account, wherein the at least one verification action further comprises a second verification action upon determining the amount of time the address has been specified as the billing address does not exceed a time threshold.

14. The non-transitory computer-readable storage medium of claim 8, further comprising instructions executable by the processor to cause the processor to:
  transmit, to the device associated with the account, an indication that the autonomous vehicle is proximate to the address; and
  receive user input from the device associated with the account specifying that the autonomous vehicle arrived at the address prior to unlocking the account.

15. An autonomous vehicle, comprising:
  a processor circuit;
  a camera; and
  a memory storing instructions which when executed by the processor circuit cause the processor circuit to:
    receive an indication that an account has been locked based on a number of invalid attempts to access the account exceeding a threshold specified in a security policy;
    determine an address associated with the account and at least one verification action required to unlock the account;
    transmit, to a device associated with the account, an indication of the at least one verification action required to unlock the account;
    cause the camera to capture a first image of a user associated with the account proximate to a building associated with the address;
    determine, based on an analysis of the first image, that the user is depicted in the first image and that the user has performed the at least one verification action; and
    cause the account to be unlocked based on the indications received from the autonomous vehicle specifying that the user is proximate to the building and that the at least one verification action has been performed.

16. The autonomous vehicle of claim 15, wherein the autonomous vehicle determines that the at least one verification action has been completed based on at least one of: a second image, received speech data, received biometric data, and pairing the device to the autonomous vehicle.

17. The autonomous vehicle of claim 16, wherein the at least one verification action comprises one or more of: (i) a gesture, (ii) a speech, (iii) a biometric identifier, (iv) pairing the device to the autonomous vehicle via a wireless data connection, and (v) holding a card associated with the account, wherein the biometric identifier comprises one or more of: (i) a fingerprint, (ii) an iris scan, and (iii) a face.

18. The autonomous vehicle of claim 17, the memory storing instructions which when executed by the processor circuit cause the processor circuit to:
  establish the wireless data connection with the device;
  receive the speech via a microphone; and
  capture, via one or more biometric interfaces, biometric data of the user.

19. The autonomous vehicle of claim 18, the memory storing instructions which when executed by the processor circuit cause the processor circuit to:
  compare the received speech to a known speech of the user;
  receive data identifying the user via the wireless data connection; and
  compare the received biometric data to known biometric data of the user.

20. The autonomous vehicle of claim 15, wherein the autonomous vehicle comprises one or more of: (i) an unmanned aerial vehicle, (ii) a robot, and (iii) an autonomous car, wherein the at least one verification action comprises a first verification action, the memory storing instructions which when executed by the processor circuit cause the processor circuit to:
  determine an amount of time the address has been specified as a billing address for the account, wherein the at least one verification action further comprises a second verification action upon determining the amount of time the address has been specified as the billing address does not exceed a time threshold; and
  transmit an indication to unlock the account to a server.

* * * * *